United States Patent
Ji et al.

(10) Patent No.: US 11,392,825 B2
(45) Date of Patent: Jul. 19, 2022

(54) METHOD AND ALGORITHM OF RECURSIVE DEEP LEARNING QUANTIZATION FOR WEIGHT BIT REDUCTION

(71) Applicant: Samsung Electronics Co., Ltd., Suwon-si (KR)

(72) Inventors: Zhengping Ji, Temple City, CA (US); John Wakefield Brothers, Calistoga, CA (US)

(73) Assignee: SAMSUNG ELECTRONICS CO., LTD.

( * ) Notice: Subject to any disclaimer, the term of this patent is extended or adjusted under 35 U.S.C. 154(b) by 1204 days.

(21) Appl. No.: 15/464,330

(22) Filed: Mar. 20, 2017

(65) Prior Publication Data
US 2018/0197081 A1    Jul. 12, 2018

Related U.S. Application Data

(60) Provisional application No. 62/444,352, filed on Jan. 9, 2017.

(51) Int. Cl.
*G06N 3/08* (2006.01)
*G06N 3/04* (2006.01)
*G06N 3/063* (2006.01)

(52) U.S. Cl.
CPC .............. *G06N 3/08* (2013.01); *G06N 3/0454* (2013.01); *G06N 3/063* (2013.01)

(58) Field of Classification Search
CPC .................................. G06N 3/063; G06N 3/08
See application file for complete search history.

(56) References Cited

U.S. PATENT DOCUMENTS 6,421,467 B1    7/2002  Mitra
8,655,108 B2 *  2/2014  Pan ...................... G06T 3/4007
                                                          382/298

(Continued)

OTHER PUBLICATIONS

Bagirov et al, "A new nonsmooth optimization algorithm for minimum sum-of-squares clustering problems", 2004, European Journal of Operational Research, vol. 170, Issue 2, pp. 578-596. (Year: 2004).*

(Continued)

*Primary Examiner* — Alexey Shmatov
*Assistant Examiner* — Clint Mullinax
(74) *Attorney, Agent, or Firm* — Renaissance IP Law Group LLP

(57) ABSTRACT

A system and method to reduce weight storage bits for a deep-learning network includes a quantizing module and a cluster-number reduction module. The quantizing module quantizes neural weights of each quantization layer of the deep-learning network. The cluster-number reduction module reduces the predetermined number of clusters for a layer having a clustering error that is a minimum of the clustering errors of the plurality of quantization layers. The quantizing module requantizes the layer based on the reduced predetermined number of clusters for the layer and the cluster-number reduction module further determines another layer having a clustering error that is a minimum of the clustering errors of the plurality of quantized layers and reduces the predetermined number of clusters for the another layer until a recognition performance of the deep-learning network has been reduced by a predetermined threshold.

20 Claims, 8 Drawing Sheets

(56) References Cited

U.S. PATENT DOCUMENTS

| | | | |
|---|---|---|---|
| 2006/0161814 A1* | 7/2006 | Wocke | G06K 9/6251 |
| | | | 714/26 |
| 2013/0031063 A1* | 1/2013 | Freris | G06K 9/6223 |
| | | | 707/693 |
| 2016/0086078 A1 | 3/2016 | Ji et al. | |
| 2016/0328646 A1 | 11/2016 | Lin et al. | |

OTHER PUBLICATIONS

Du, "Clustering: a neural network approach", 2010, Elsevier Neural Networks, vol. 23, pp. 89-107. (Year: 2010).*

Dogan et al, "SOM++: Integration of Self-Organizing Map and K-Means++ Algorithms", 2013, Machine learning and data mining in pattern recognition, vol. 7988, pp. 246-259. (Year: 2013).*

Gong et al, "Compressing Deep Convolutional Networks using Vector Quantization", 2014, CoRR, arXiv:1412.6115v1, pp. 1-10. (Year: 2014).*

Han et al, "Deep Compression: Compressing Deep Neural Networks with Pruning, Trained Quantization and Huffman Coding", 2016, CoRR, arXiv:1510.00149, pp. 1-14. (Year: 2016).*

Wu et al, "Quantized Convolutional Neural Networks for Mobile Devices", 2016, Proceedings of the IEEE Conference on Computer Vision and Pattern Recognition (CVPR), pp. 4820-4828. (Year: 2016).*

* cited by examiner

| Layers | # Weights | Iteration 0 | | Iteration 1 | | Iteration 2 | | Iteration 3 | |
|---|---|---|---|---|---|---|---|---|---|
| | | # Clusters | $\varepsilon_l$ ($\times 10^{-6}$) | # Clusters | $\varepsilon_l$ ($\times 10^{-6}$) | # Clusters | $\varepsilon_l$ ($\times 10^{-6}$) | # Clusters | $\varepsilon_l$ ($\times 10^{-6}$) |
| CONV1_1 | 1.8K | 138 | 1.754 | 138 | 1.754 | 138 | 1.754 | 138 | 1.754 |
| CONV1_2 | 36.9K | 67 | 1.276 | 67 | 1.276 | 67 | 1.276 | 67 | 1.276 |
| CONV2_1 | 73.8K | 100 | 0.672 | 100 | 0.672 | 100 | 0.672 | 100 | 0.672 |
| CONV2_2 | 147.5K | 69 | 0.638 | 69 | 0.638 | 69 | 0.638 | 69 | 0.638 |
| CONV3_1 | 295.2K | 78 | 0.351 | 78 | 0.351 | 78 | 0.351 | 78 | 0.351 |
| CONV3_2 | 590.1K | 67 | 0.291 | 67 | 0.291 | 67 | 0.291 | 67 | 0.291 |
| CONV3_3 | 590.1K | 73 | 0.227 | 73 | 0.227 | 73 | 0.227 | 73 | 0.227 |
| CONV4_1 | 1.2M | 56 | 0.235 | 56 | 0.235 | 56 | 0.235 | 56 | 0.235 |
| CONV4_2 | 2.4M | 44 | 0.188 | 44 | 0.188 | 44 | 0.188 | 44 | 0.188 |
| CONV4_3 | 2.4M | 51 | 0.151 | 51 | 0.151 | 50 | 0.158 | 50 | 0.158 |
| CONV5_1 | 2.4M | 52 | 0.148 | 51 | 0.154 | 51 | 0.154 | 50 | 0.161 |
| CONV5_2 | 24M | 38 | 0.230 | 38 | 0.230 | 38 | 0.230 | 38 | 0.230 |
| CONV5_3 | 24M | 38 | 0.215 | 38 | 0.215 | 38 | 0.215 | 38 | 0.215 |
| FC6 | 102.8M | 8 | 0.611 | 8 | 0.611 | 8 | 0.611 | 8 | 0.611 |
| FC7 | 16.8M | 9 | 0.975 | 9 | 0.975 | 9 | 0.975 | 9 | 0.975 |
| FC8 | 4.1M | 13 | 0.752 | 13 | 0.752 | 13 | 0.752 | 13 | 0.752 |
| Top 5 Acc | | 88.38% | | 88.38% | | 88.32% | | 88.32% | |
| Top 1 Acc | | 67.73% | | 67.73% | | 67.68% | | 67.68% | |

FIG. 3

| Layers | # Weights | Iteration 0 | | Iteration 18 | | Iteration 100 | | Iteration 200 | | Iteration 360 | |
|---|---|---|---|---|---|---|---|---|---|---|---|
| | | # Clusters | $\varepsilon_l$ ($\times 10^{-6}$) | # Clusters | $\varepsilon_l$ ($\times 10^{-6}$) | # Clusters | $\varepsilon_l$ ($\times 10^{-6}$) | # Clusters | $\varepsilon_l$ ($\times 10^{-6}$) | # Clusters | $\varepsilon_l$ ($\times 10^{-6}$) |
| CONV1_1 | 1.8K | 138 | 1.754 | 138 | 1.754 | 138 | 1.754 | 138 | 1.754 | 138 | 1.754 |
| CONV1_2 | 36.9K | 67 | 1.276 | 67 | 1.276 | 67 | 1.276 | 67 | 1.276 | 64 | 1.402 |
| CONV2_1 | 73.8K | 100 | 0.672 | 100 | 0.672 | 100 | 0.672 | 100 | 0.672 | 71 | 1.408 |
| CONV2_2 | 147.5K | 69 | 0.638 | 69 | 0.638 | 69 | 0.638 | 69 | 0.638 | 47 | 1.416 |
| CONV3_1 | 295.2K | 78 | 0.351 | 78 | 0.351 | 77 | 0.359 | 58 | 0.648 | 40 | 1.388 |
| CONV3_2 | 590.1K | 67 | 0.291 | 67 | 0.291 | 60 | 0.357 | 45 | 0.662 | 31 | 1.444 |
| CONV3_3 | 590.1K | 73 | 0.227 | 73 | 0.227 | 58 | 0.356 | 43 | 0.654 | 29 | 1.448 |
| CONV4_1 | 1.2M | 56 | 0.235 | 56 | 0.235 | 45 | 0.369 | 34 | 0.658 | 23 | 1.460 |
| CONV4_2 | 2.4M | 44 | 0.188 | 42 | 0.207 | 32 | 0.361 | 24 | 0.652 | 16 | 1.446 |
| CONV4_3 | 2.4M | 51 | 0.151 | 44 | 0.202 | 33 | 0.363 | 25 | 0.648 | 16 | 1.519 |
| CONV5_1 | 2.4M | 52 | 0.148 | 44 | 0.209 | 33 | 0.370 | 25 | 0.640 | 17 | 1.379 |
| CONV5_2 | 2.4M | 38 | 0.230 | 38 | 0.230 | 30 | 0.367 | 22 | 0.665 | 14 | 1.557 |
| CONV5_3 | 2.4M | 38 | 0.215 | 38 | 0.215 | 29 | 0.367 | 22 | 0.636 | 14 | 1.480 |
| FC6 | 102.8M | 8 | 0.611 | 6 | 0.611 | 6 | 0.611 | 5 | 0.828 | 3 | 2.020 |
| FC7 | 16.8M | 9 | 0.975 | 9 | 0.975 | 9 | 0.975 | 9 | 0.975 | 7 | 1.557 |
| FC8 | 4.1M | 13 | 0.752 | 13 | 0.752 | 13 | 0.752 | 13 | 0.752 | 9 | 1.510 |
| Top 5 Acc | | 88.38% | | 88.40% | | 88.31% | | 88.16% | | 87.40% | |
| Top 1 Acc | | 67.73% | | 67.72% | | 67.74% | | 67.45% | | 66.20% | |

FIG. 4

| Layers | # Weights | Sun – Uniform Quantization 501 | Sun – K-means Non-uniform Quantization 502 | Pruning + K-means with Random Initialization 503 | Pruning + K-means with Log-Space Initialization 504 | Song – Pruning + K-means with linear initialization 505 | Pruning + K-means with Linear Initialization + Merging 506 | Pruning + Recursive Deep Quantization 507 |
|---|---|---|---|---|---|---|---|---|
| CONV1_1 | 1.8K | 4096 | 256 | 256 | 231 | 159 | 159 | 138 |
| CONV1_2 | 36.9K | 4096 | 256 | 256 | 236 | 173 | 122 | 67 |
| CONV2_1 | 73.8K | 4096 | 1024 | 256 | 237 | 184 | 175 | 100 |
| CONV2_2 | 147.5K | 4096 | 2048 | 256 | 243 | 186 | 117 | 69 |
| CONV3_1 | 295.2K | 4096 | 2048 | 256 | 227 | 144 | 134 | 78 |
| CONV3_2 | 590.1K | 4096 | 2048 | 256 | 214 | 127 | 117 | 67 |
| CONV3_3 | 590.1K | 4096 | 2048 | 256 | 231 | 149 | 128 | 73 |
| CONV4_1 | 1.2M | 4096 | 2048 | 256 | 232 | 163 | 98 | 56 |
| CONV4_2 | 2.4M | 4096 | 2048 | 256 | 209 | 120 | 75 | 42 |
| CONV4_3 | 2.4M | 4096 | 1024 | 256 | 227 | 152 | 89 | 44 |
| CONV5_1 | 2.4M | 4096 | 1024 | 256 | 244 | 187 | 89 | 44 |
| CONV5_2 | 2.4M | 4096 | 512 | 256 | 214 | 131 | 71 | 38 |
| CONV5_3 | 2.4M | 4096 | 256 | 256 | 211 | 126 | 65 | 38 |
| FC6 | 102.8M | 4096 | 64 | 32 | 30 | 31 | 19 | 6 |
| FC7 | 16.8M | 4096 | 32 | 32 | 28 | 32 | 21 | 9 |
| FC8 | 4.1M | 4096 | 32 | 32 | 32 | 31 | 26 | 13 |

FIG. 5

METHOD AND ALGORITHM OF RECURSIVE DEEP LEARNING QUANTIZATION FOR WEIGHT BIT REDUCTION

CROSS-REFERENCE TO RELATED APPLICATION

This patent application claims the priority benefit under 35 U.S.C. § 119(e) of U.S. Provisional Patent Application No. 62/444,352, filed on Jan. 9, 2017, the disclosure of which is incorporated herein by reference in its entirety.

TECHNICAL FIELD

The subject matter disclosed herein generally relates to deep-learning networks, and more particularly, to an apparatus and method to reduce weight storage bits of a deep-learning network.

BACKGROUND

Deep learning is a widely used technology in fields of artificial intelligence (AI) and computer vision. Various deep-learning architectures, such as convolutional neural networks (CNNs), deep-belief networks (DBNs) and auto-encoders, have been shown to produce state-of-the-art results for tasks, such as visual object recognition, automatic speech recognition, natural language processing, and music/audio signal processing. The main efforts of deep learning have been focused on the software implementation with respect to the various network architectures, learning algorithms and applications. Nevertheless, hardware implementations embodying more powerful on-board learning behavior is still limited. A major challenge for deep-learning hardware is related to an inadequate model precision; more specifically, the low bit resolution of network weights and data inputs. For instance, a software implementation may enjoy a double-precision (64-bit) computation, but such a level of precision becomes implausible when considering hardware constraints like physical size and power consumption.

SUMMARY

An example embodiment provides a system to reduce weight storage bits for a deep-learning network that may include a cluster initializer, a neural-weight quantizer, a clustering-error determiner and a cluster-number reducer. The cluster initializer may initialize a predetermined number of clusters $k_l$ to quantize each layer l of the deep-learning network. The neural-weight quantizer may repeatedly allocate centroids and cluster the weights with respect to the centroids for quantization until a lowest average clustering error $\varepsilon_l$ is determined for each quantization layer l. The clustering-error determiner may determine from the plurality of quantization layers a layer l* having a clustering error $\varepsilon_{l*}$ that is a minimum of the clustering errors $\varepsilon_l$ of the plurality of quantization layers. The cluster-number reducer may reduce the predetermined number of clusters for the layer l* to be the number of clusters used to quantize the layer l* less one. The neural-weight quantizer may further requantize the layer l* based on the reduced predetermined number of clusters for the layer l* and the cluster-number reducer may further determine from the plurality of quantization layers another layer l* having a clustering error $\varepsilon_{l*}$ that is a minimum of the clustering errors $\varepsilon_l$ of the plurality of quantization layers and may reduce the predetermined number of clusters for the another layer l* to be the number of clusters used to quantize the another layer less one until a recognition performance of the deep-learning network has been reduced by a predetermined threshold. In one embodiment, the neural-weight quantizer uses K-means++ to repeatedly allocate the centroids and cluster (i.e., quantize) the weights with respect to the centroids. The clustering error $\varepsilon_l$ may comprises a square cluster error per non-zero weight that may comprise $$\varepsilon_l = \frac{1}{n}\sum_{i=1}^{n}(w_i - C_l)^2, \text{ s.t. } w_i > 0,$$

in which n is the predetermined number of clusters used to quantize a layer, i is an index variable, $w_i$ is a non-zero weight, and $C_l$ is a centroid for the quantization layer l.

An example embodiment provides a method to reduce weight storage bits for a deep-learning network that may comprise initializing a predetermined number of clusters $k_l$ for each layer l of the deep-learning network having a plurality of layers; for each layer l, repeatedly allocating centroids and clustering weights with respect to the centroids for quantization until a lowest average clustering error $\varepsilon_l$ is determined for the layer l; determining from the plurality of layers a layer l* having the average clustering error $\varepsilon_{l*}$ that is a minimum of the clustering errors $\varepsilon_l$ of the plurality of layers quantized; reducing the predetermined number of clusters for the layer l* to be the number of clusters used to quantize the layer l* less one; requantizing the layer l* based on the reduced predetermined number of clusters for the layer l*; and continuing to determine from the plurality of layers, another layer l* having a clustering error $\varepsilon_{l*}$ that is a minimum of the clustering errors $\varepsilon_l$ of the plurality of layers, reducing the predetermined number of clusters for the another layer l* to be the number of clusters used to quantize the another layer less one, and requantizing the another layer l* based on the reduced predetermined number of clusters for the another layer l* until a recognition performance of the deep-learning network has been reduced by a predetermined threshold.

An example embodiment provides a system to reduce weight storage bits for a deep-learning network may include a weight-quantizing module and a cluster-number reduction module. The weight-quantizing module may quantize neural weights of each layer l of the deep-learning network based on a predetermined number of clusters $k_l$ that have been initialized for each layer. The cluster-number reduction module may reduce the predetermined number of clusters for a layer l* in which the layer l* may have a clustering error $\varepsilon_{l*}$ that is a minimum of the clustering errors $\varepsilon_l$ of the plurality of quantization layers quantized by the weight-quantizing module. The weight-quantizing module may further requantize the layer l* based on the reduced predetermined number of clusters for the layer l* and the cluster-number reduction module may further determine from the plurality of quantizing layers another layer l* having a clustering error $\varepsilon_l$ that is a minimum of the clustering errors $\varepsilon_l$ of the plurality of quantization layers and may reduce the predetermined number of clusters for the another layer l* to be the number of clusters used to quantize the layer minus one until a recognition performance of the deep-learning network has been reduced by a predetermined threshold.

BRIEF DESCRIPTION OF THE DRAWINGS

In the following section, the aspects of the subject matter disclosed herein will be described with reference to exemplary embodiments illustrated in the figures, in which:

FIG. 3 depicts a Table of example results of four iterations of the RDQ technique according to the subject matter disclosed herein as applied to the VGG 16 architecture;

FIG. 4 depicts a Table of example results of five iterations of the RDQ technique according to the subject matter disclosed herein as applied to the VGG 16 architecture;

FIG. 5 depicts a Table that sets forth a comparison in the reduction in weights for each layer of the VGG 16 architecture that is obtained for different quantizing techniques;

DETAILED DESCRIPTION

Figure 1:
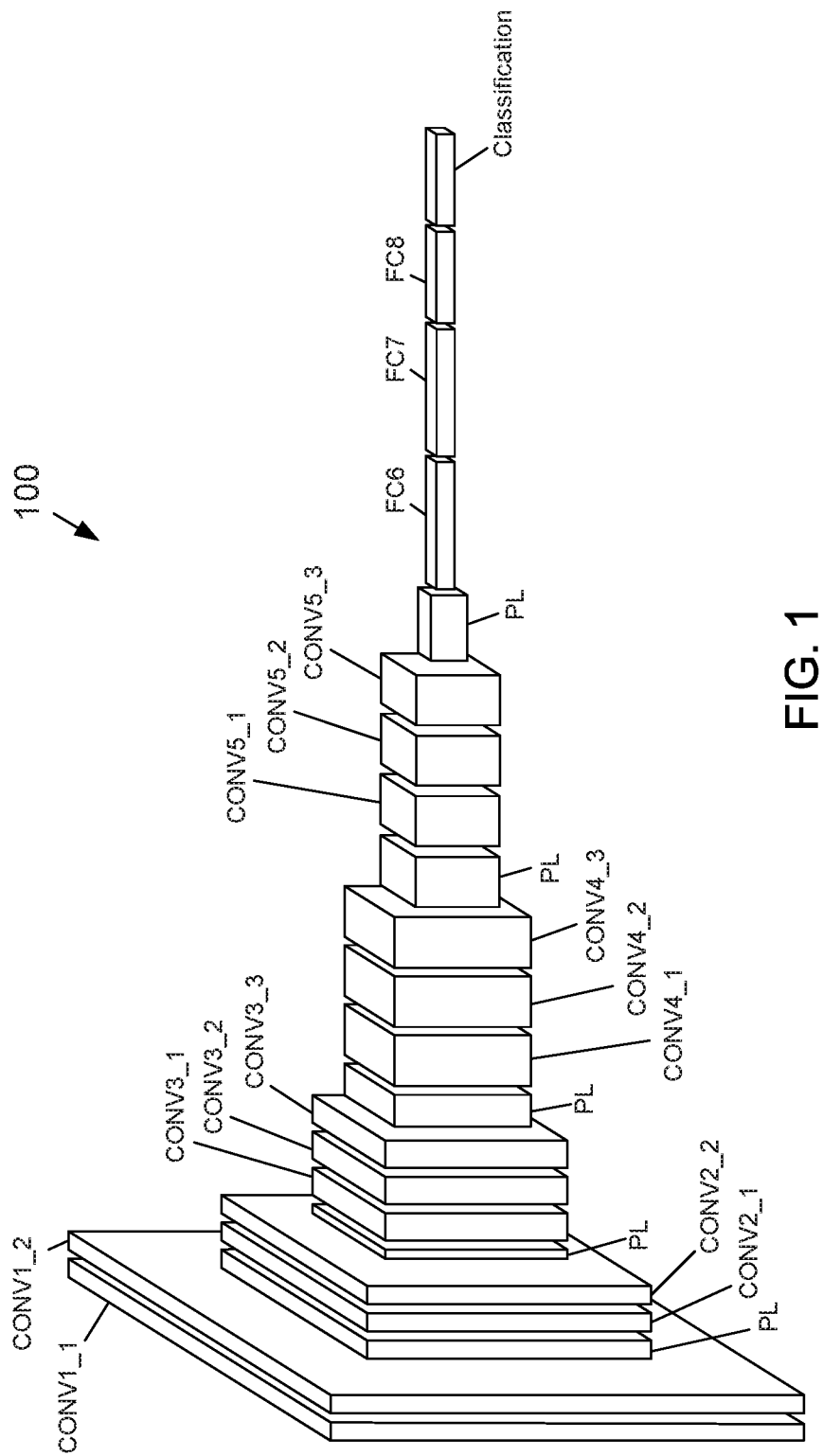
FIG. 1 depicts the well-known VGG 16 architecture that is used as a deep-learning network.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing particular exemplary embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement the teachings of particular embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. The term "software," as applied to any implementation described herein, may be embodied as a software package, code and/or instruction set or instructions. The term "hardware," as applied to any implementation described herein, may include, for example, singly or in any combination, hardwired circuitry, programmable circuitry, state-machine circuitry, and/or firmware that stores instructions executed by programmable circuitry. The modules may, collectively or individually, be embodied as software, firmware and/or hardware that forms part of a larger system, such as, but not limited to, an integrated circuit (IC), system on-chip (SoC) and so forth.

FIG. 1 depicts the well-known VGG 16 architecture 100. The VGG 16 architecture 100 includes 13 convolutional (CONV) layers, three fully connected (FC) layers, and five pooling layers (PLs). The input to the VGG 16 architecture 100 is applied to convolutional layer CONV1_1, and the output is provided at Classification.

Due to the large number of layers in a typical deep-learning neural network, such as the VGG 16 architecture 100, determining optimal quantization bits for each layer poses a highly complex task because the various layers are dependent with other layers within the network. That is, quantization of the neuronal weights in one layer is dependent on the quantization of other layers so that a greedy layer-wise quantization approach to reach a minimum number of quantization bits at each layer is often shown to be ineffective, which also leads to significant loss of overall system accuracy. To reduce searching complexities, current benchmarks constrain the quantization of the neuronal weights to quantize one type of layer to be the same number of bits. For example, one benchmark sets 256 quantization levels for convolutional layers and 32 quantization levels for fully connected layers for the VGG 16 architecture. Fixed quantization levels that are imposed by such benchmarks are not optimal for a number of reasons. To reach lower bit resolution for deep-learning neural networks, the neuronal weights should be quantized with minimal quantization levels at each layer.

Figure 2:
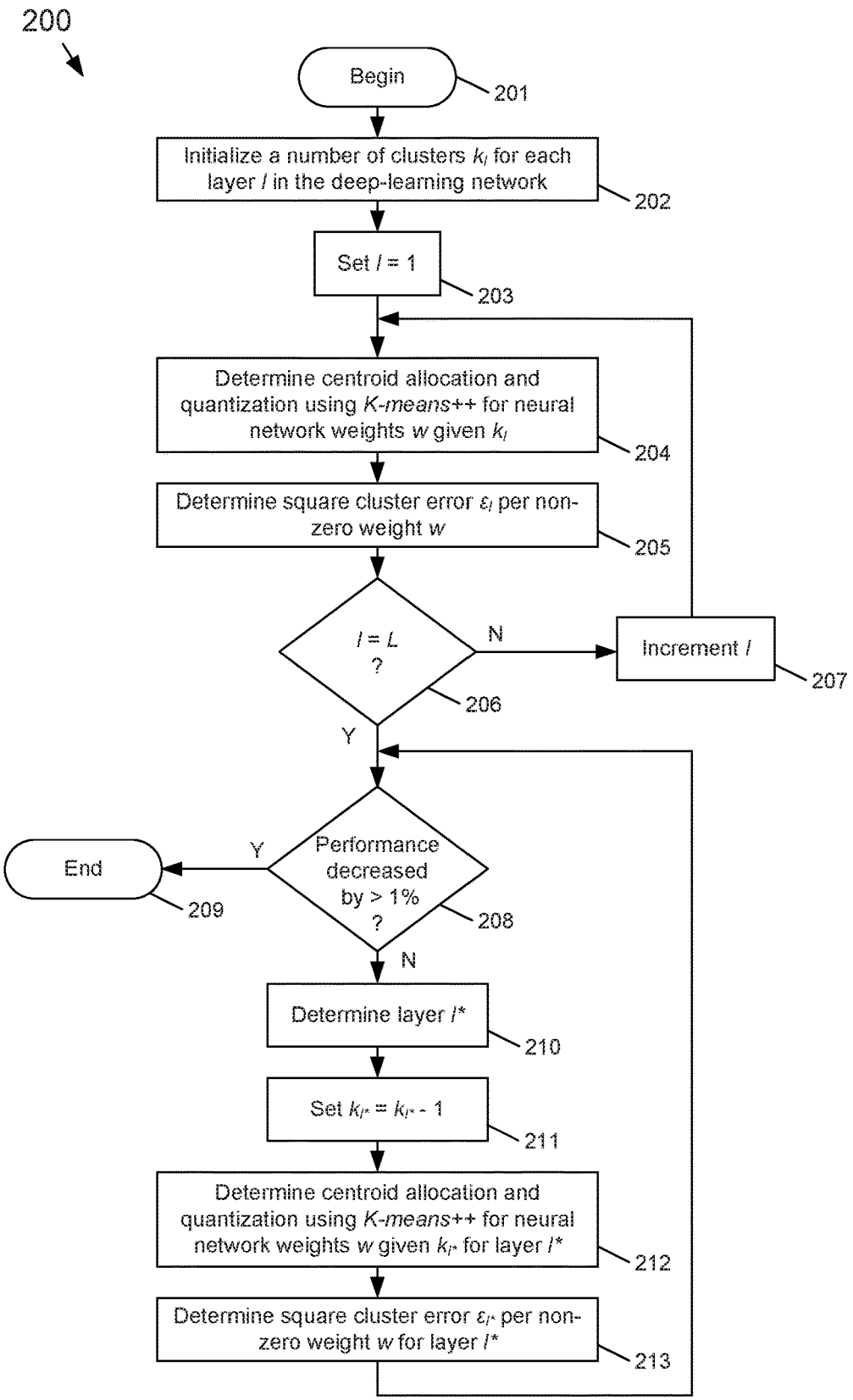
FIG. 2 depicts an example embodiment of an RDQ technique according to the subject matter disclosed herein.

FIG. 2 depicts an example embodiment of a recursive deep quantization (RDQ) technique 200 according to the subject matter disclosed herein. The RDQ technique 200 may be used to quantize layers of a deep-learning neural network and provides (1) an order that the layers should be quantized, (2) when to stop quantization at each layer, (3) an overall optimal quantization path, and (4) whether a layer is to be repeatedly quantized based on the results of other quantized layers to reach overall minimum quantization levels for a network. Moreover, the RDQ technique 200 eliminates fixed or pre-constrained quantization levels so that quantization levels may be minimized and optimized for each layer with an overall result of a zero or a minimal performance loss for the network. Thus, the RDQ technique 200 may be used to provide a deep-learning neural network that may be represented with a low bit resolution and maintain a good performance for, for example, an image recognition task.

In FIG. 2, the RDQ technique 200 begins at 201. At 202, a number of clusters $k_l$ is initialized for each layer l of a deep-learning network having L layers, in which l is a layer that ranges from 1 to L, and L is an integer. The number of clusters $k_l$ initialized for each layer may be different for each layer. The number of clusters $k_l$ may be arbitrarily selected for each layer, but other, better strategies for initializing the number of clusters for each respective layer may be used, such as a benchmark cluster merging technique 600 described below in FIG. 6. It should be understood that the RDQ technique 200 does not need to have the number of clusters $k_l$ initialized for each layer of a deep-learning network, and may work directly on the weights in a deep-learning network without the cluster initialization at 202. Nevertheless, use of an initialization process to set the number of clusters for each respective layer of a deep-learning network will expedite the overall process.

At 203, l is initialized to be equal to 1, and goes through all layers to the end. At 204, the K-means++ algorithm is used to determine the centroid allocation and quantization for the neural network weights at layer l. At 205, a square cluster error $\varepsilon_l$ per non-zero weight is determined for the layer l. In one embodiment, the square cluster error $\varepsilon_l$ per non-zero weight is determined as $$\varepsilon_l = \frac{1}{n}\sum_{i=1}^{n}(w_i - C_l)^2, \text{ s.t. } w_i > 0 \qquad (1)$$

in which n is the predetermined number of clusters used to quantize a layer, i is an index variable, $w_i$ is a non-zero weight, and $C_l$ is a centroid for the layer l. For the first quantization iteration through the network, the predetermined number of clusters that is used to quantize a layer is, for example, the number of clusters $k_l$ initialized for the layer at 202. For subsequent quantization iterations, the number of clusters that is used to quantize a layer may be reduced by the RDQ technique 200.

At 206, it is determined whether the weights for all of the layers of the deep-learning network have been quantized and a square cluster error $\varepsilon_l$ has been determined for each layer. If, at 206, it is determined that all of the weights for all of the layers of the deep-learning network have not been quantized and a square cluster error $\varepsilon_l$ has not been determined for each layer, flow continues to 207 where the layer l is incremented. Flow then returns to 204.

If, at 206, it is determined that all of the weights for all of the layers of the deep-learning network have been quantized and a square cluster error $\varepsilon_l$ has been determined for each layer, flow continues to 208 where it is determined whether the recognition performance of the deep-learning network has decreased from a baseline recognition performance by a threshold amount. In one embodiment, the threshold amount may be about 1%. In other embodiments, the threshold amount may be different from about 1%.

If, at 208, the recognition performance of the deep-learning network has not decreased from the baseline recognition performance by the threshold amount, flow continues to 210 where the layer having the smallest square cluster error $\varepsilon_{l*}$ is identified as layer l*. At 211, the number of clusters that were used to quantize the weights of the layer l* is reduced by one. That is, $$k_{l*} = k_{l*} - 1. \qquad (2)$$

Although the number of clusters for the layer l* is disclosed as being reduced by 1, it should be understood that the number of clusters for the layer l* may be reduced by more than 1.

At 212, the K-means++ algorithm is used to determine the centroid allocation and clustering (i.e., quantization) for the neural network weights for layer l*. At 213, the square cluster error $\varepsilon_l$ per non-zero weight w for the layer l*. Flow returns to 208 where the deep-learning network is operated using the newly determined quantized weights for the different layers. In particular, the quantized weights determined at 212 for layer l* are used to operate the deep-learning network. At 208, it is determined whether the recognition performance of the deep-learning network has decreased from the baseline recognition performance by the threshold amount. If, at 208, the recognition performance of the deep-learning network has not decreased by the threshold amount, flow continues to 210. If, at 208, the recognition performance of the deep-learning network has decreased by the threshold amount, flow continues to 209 where the process ends.

FIG. 3 depicts a Table 300 of example results of four iterations of the RDQ technique 200 as applied to the VGG 16 architecture 100, which is depicted in FIG. 1. At 301 in Table 300, the initial number of weights is shown for each layer for the VGG 16 architecture 100. At 302, the number of clusters $k_l$ is initialized for each layer l is shown. This corresponds to the result of operation 202 in FIG. 2. The particular numbers shown at 302 in Table 300 were obtained by using the benchmark cluster merging technique 600 described below in FIG. 6. For iteration 0, the square cluster error $\varepsilon_l$ is determined for each layer, and the recognition performance of the VGG 16 architecture 100 is determined. As indicated at 303, the recognition performance based on the top 5 score accumulations is 88.38%, and based on the top 1 score accumulation is 67.73%. For purposes of the explanation herein, these two recognition performances will be used as the baseline recognition performance.

It is determined that the CONV5_1 layer has the lowest square cluster error $\varepsilon_l$ of 0.148, as indicated at 304. This corresponds to 210 in FIG. 2. The number of clusters (i.e., 52) that were used for quantizing the weights of layer CONV5_1 is reduced by one to be 51 (shown in Iteration 1). The weights of layer CONV5_1 are requantized in Iteration 1 using the reduced number of clusters. As indicated at 305, the recognition performance of the deep-learning network after Iteration 1 is 88.38% for the top 5 score accumulation and 67.73% for the top 1 accumulation.

The recognition performance of the deep-learning network after Iteration 1 has not dropped by the threshold amount of about 1%, so it is determined that the CONV4_3 layer has the lowest square cluster error $\varepsilon_l$ of 0.151, as indicated at 306. The number of clusters (i.e., 51) that were used for quantizing the weights of layer CONV4_3 is reduced by one to be 50 (shown in Iteration 2). The weights of layer CONV4_3 are requantized in Iteration 2. As indicated at 307, the recognition performance of the deep-learning network after Iteration 1 is 88.32% for the top 5 score accumulations and 67.68% for the top 1 score accumulation.

The recognition performance of the deep-learning network after Iteration 2 has not dropped by the threshold amount of about 1%, so it is determined that the CONV5_1 layer has the lowest square cluster error $\varepsilon_l$ of 0.154, as indicated at 308. The number of clusters (i.e., 51) that were used for quantizing the weights of layer CONV4_3 is reduced by one to be 50 (shown in Iteration 3). The weights of layer CONV5_1 are requantized in Iteration 3. As indicated at 309, the recognition performance of the deep-learning network after Iteration 21 is 88.32% for the top 5 score accumulations and 67.68% for the top 1 score accumulation. This process continues until the recognition performance of the deep-learning network drops by the threshold amount.

FIG. 4 depicts a Table 400 of example results of five iterations of the RDQ technique 200 as applied to the VGG 16 architecture 100, which is depicted in FIG. 1. Table 400 is similar to Table 300 of FIG. 3 by showing the results of the RDQ technique 200 after Iterations 18, 100, 200 and 360, in addition to the results of Iteration 0. The layers having a reduction in the weights can be seen in bold. As shown at 401, the recognition performance of the deep-learning network after Iteration 360 has dropped by the threshold amount of about 1%, so the RDQ technique is ended.

FIG. 5 depicts a Table 500 that sets forth a comparison in the reduction in weights for each layer of the VGG 16 architecture 100 that is obtained for different quantizing techniques. At 501, the Sun technique of uniform quantization of 4096 clusters per layer. At 502, the Sun technique that uses a K-means non-uniform quantization technique shows a reduction in clusters for each layer in comparison to the Sun technique indicated at 501. At 503, the results of a Pruning with K-means and a random initialization technique are shown. It should be noted that the technique indicated at 503 was referred to in the description of FIG. 1 as a benchmark that sets 256 quantization levels for convolutional layers and 32 quantization levels for fully connected layers for the VGG 16 architecture. Further improvement in the reduction of weights per layer is shown at 504, which uses a Pruning with K-means and a log-space initialization technique. At 505, still further improvement is provided by Song's technique of using K-means with linear initialization. At 506, continued improvement is provided by a technique that uses Pruning and K-means with a linear initialization and benchmark cluster merging (FIG. 6).

Lastly, the results of the RDQ technique 200 are indicated at 507. Although not indicated in FIG. 5, the results of the RDQ technique 200 utilized the benchmark cluster merging technique 600 of FIG. 6. Nevertheless, the RDQ technique 200 does not need to have the number of clusters $k_l$ initialized for each layer of a deep-learning network, and may work directly on the weights in a deep-learning network without the cluster initialization. As can be seen from Table 500, the RDQ technique disclosed herein may be used to quantize layers of a deep-learning neural network that provides a data-based quantization initialization, an automatic determination for the order that the layers of the network should be quantized, and a way to optimally end quantization.

Figure 6:
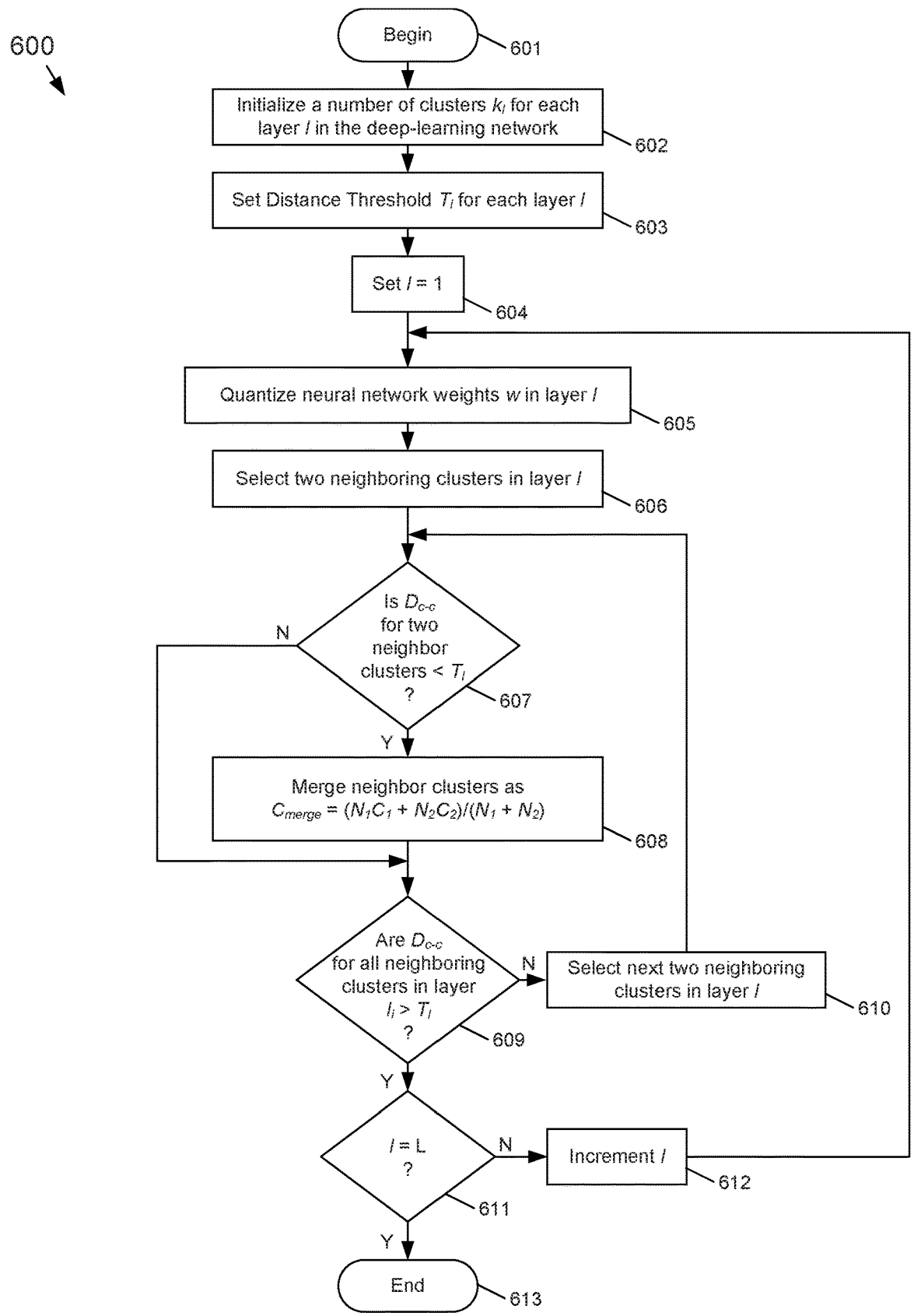
FIG. 6 depicts an example embodiment of a benchmark cluster merging technique.

FIG. 6 depicts an example embodiment of a benchmark cluster merging technique 600. At 601, the process begins. At 602, the number of clusters $k_l$ is initialized for each layer l of a deep-learning network, such as the VGG 16 architecture 100 shown in FIG. 1. At 602, a distance threshold $T_l$ is set for each layer l. The same distance threshold $T_l$ may be used for each layer l, or a different distance threshold may be used for each layer. At 604, a layer l is initialized. At 605, the neural network weights are quantized in layer l, and at 606 two neighboring clusters are selected in layer l.

If, at 607, the centroid-to-centroid distance $D_{c-c}$ is less than the distance threshold $T_l$ for the layer, flow continues to 608 where the two neighboring clusters are merged to form a new cluster center $C_{merge}$ as $$C_{merge} = \frac{(N_1 C_1 + N_2 C_2)}{(N_1 + N_2)}, \quad (3)$$

in which $C_1$ and $C_2$ are respectively the cluster centers of the two neighboring clusters, and $N_1$ and $N_2$ are respectively a number of weight points belonging to the two respective neighboring clusters.

If, at 607, the centroid-to-centroid distance $D_{c-c}$ of the two selected neighboring clusters is greater than the distance threshold $T_l$ for the layer, flow bypasses 608. At 609, it is determined whether all of the centroid-to-centroid distances are greater than the distance threshold $T_l$ for the layer. If so, flow returns to 610, otherwise flow continues to 611 to determine whether all layers have been processed. If not, flow returns to 605; otherwise the process ends at 613.

Figure 7:
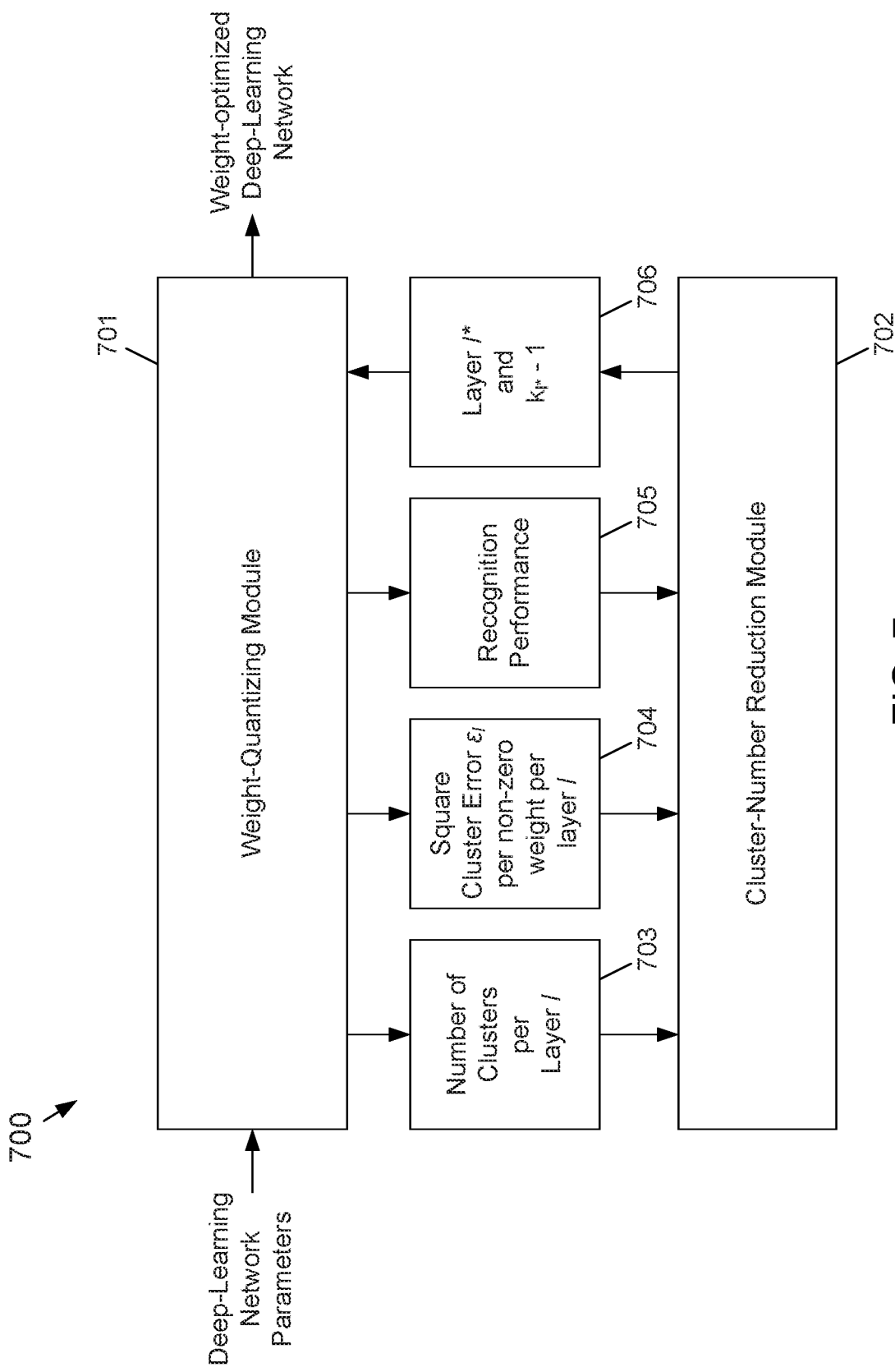
FIG. 7 depicts a functional block diagram of an example embodiment of a recursive deep quantization processor according to the subject matter disclosed herein.

FIG. 7 depicts a functional block diagram of an example embodiment of a recursive deep quantization (RDQ) processor 700 according to the subject matter disclosed herein. The RDQ processor 700 may include a weight-quantizing module 701 and a cluster-number reduction module 702. The weight-quantizing modules 701 and the cluster-number reduction module 702 may be any combination of software, firmware and/or hardware configured to provide the functionality described herein in connection with a module. The modules 701 and 702 may, collectively or individually, be embodied as software, firmware and/or hardware that forms part of a larger system, such as, but not limited to, an integrated circuit (IC), system on-chip (SoC) and so forth.

The weight-quantizing module 701 may include as an input of all of the parameters of a deep-learning network, such as, but not limited to, the number and type of layers, and the number of weights per layer. The weight-quantizing module 701 uses the inputs to output to the cluster-number reduction module 702 the number of clusters per layer 703, the square cluster error $\varepsilon_l$ per non-zero weight w for each layer 704, and the recognition performance per iteration 705. As an output, the cluster-number reduction module 702 outputs to the weight-quantizing module 701 the layer l* and the reduced number of clusters $k_{l*}$ for the layer l*. Together the weight-quantizing module 701 and the cluster-number reduction module 702 operate to provide the functionality of the RDQ technique 200 shown in FIG. 2. In one embodiment, the output of the RDQ processor 700 is a weight-optimized deep-learning network.

In one embodiment, the operations 202 through 206 shown in FIG. 2 may be provided by the weight-quantizing module 701, and the operations 208 through 213 may be provided by the cluster-number reduction module 702. In another embodiment, the functionality may be arranged or apportioned differently between the weight-quantizing module 701 and the cluster-number reduction module 702.

Figure 8:
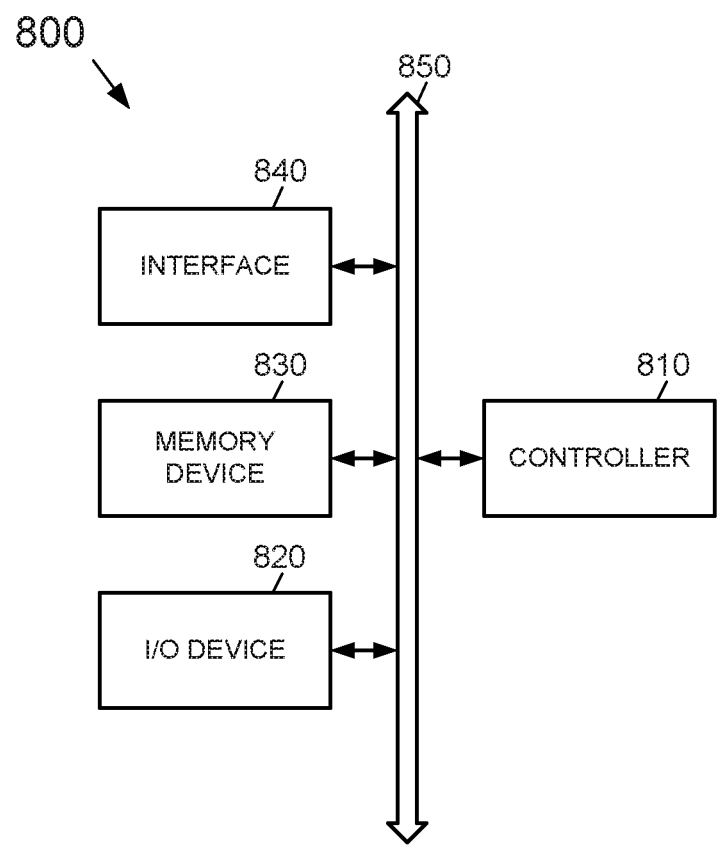
FIG. 8 depicts an electronic device that comprises one or more integrated circuits (chips) comprising recursive deep quantization processor according to the subject matter disclosed herein

FIG. 8 depicts an electronic device 800 that comprises one or more integrated circuits (chips) comprising an RDQ processor according to the subject matter disclosed herein. Electronic device 800 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 800 may comprise a controller 810, an input/output device 820 such as, but not limited to, a keypad, a keyboard, a display, or a touch-screen display, a memory 830, and a wireless interface 840 that are coupled to each other through a bus 850. The controller 810 may comprise, for example, at least one microprocessor, at least one digital signal process, at least one microcontroller, or the like. The memory 830 may be configured to store a command code to be used by the controller 810 or a user data. Electronic device 800 and the various system components comprising electronic device 800 may comprise an RDQ processor according to the subject matter disclosed herein. The electronic device 800 may use a wireless interface 840 configured to transmit data to or receive data from a wireless communication network using a RF signal. The wireless interface 840 may include, for example, an antenna, a wireless transceiver and so on. The electronic system 800 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), and so forth.

As will be recognized by those skilled in the art, the innovative concepts described herein can be modified and varied over a wide range of applications. Accordingly, the scope of claimed subject matter should not be limited to any of the specific exemplary teachings discussed above, but is instead defined by the following claims.

What is claimed is:

1. A system to reduce weight storage bits for a deep-learning network, the system comprising:
   a cluster initializing module that during a single iteration of a process to reduce weight storage bits for the deep-learning network, is configured to initialize a predetermined number of clusters $k_l$ for each layer l of a plurality of layers of the deep-learning network;
   a neural-weight quantizing module that, during the single iteration of the process to reduce weight storage bits for the deep-learning network, is configured for each layer l to repeatedly allocate centroids, to cluster weights with respect to the centroids, and quantize the clustered weights until a lowest average clustering error $\varepsilon_l$ is determined for the layer l;
   a clustering-error determining module that during the single iteration of the process to reduce weight storage bits for the deep-learning network, is configured to determine from the plurality of layers a layer l* having a clustering error $\varepsilon_{l*}$ that is a minimum of the clustering errors $\varepsilon_l$ of the plurality of layers; and
   a cluster-number reducing module that during the single iteration of the process to reduce weight storage bits for the deep-learning network is configured to reduce the predetermined number of clusters for the layer l* to be the number of clusters used to quantize the layer l* minus one;
   the neural-weight quantizing module during the single iteration of the process to reduce weight storage bits for the deep-learning network, being further configured to requantize the layer l* based on the reduced predetermined number of clusters for the layer l* and the cluster-number reducing module, during the single iteration of the process to reduce weight storage bits for the deep-learning network, being further configured to determine from the plurality of layers another layer l* having a clustering error $\varepsilon_{l*}$ that is a minimum of the clustering errors $\varepsilon_l$ of the plurality of layers and to reduce the predetermined number of clusters for the another layer l* to be the number of clusters used to quantize the another layer minus one until a recognition performance of the deep-learning network has been reduced by a predetermined threshold.

2. The system of claim 1, wherein the neural-weight quantizing module is configured to use K-means++ to repeatedly allocate the centroid and quantize the cluster with respect to the centroid of a cluster.

3. The system of claim 2, wherein the clustering error $\varepsilon_l$ comprises a square cluster error per non-zero weight.

4. The system of claim 3, wherein the clustering error $\varepsilon_l$ comprises $$\varepsilon_l = \frac{1}{n}\sum_{i=1}^{n}(w_i - C_l)^2, \text{ s.t. } w_i > 0,$$

wherein n is the predetermined number of clusters used to quantize a quantization layer, i is an index variable, $w_i$ is a non-zero weight, and $C_l$ is a centroid for quantizing layer l.

5. The system of claim 3, wherein the predetermined threshold is about 1%.

6. The system of claim 1, wherein the cluster initializing module is further configured to initialize the predetermined number of clusters $k_l$ for a quantized layer by merging two neighboring clusters in which a distance between the respective centroids of the two neighboring clusters is less than a predetermined distance to form a new cluster center $C_{merge}$.

7. The system of claim 6, wherein cluster initializing module is configured to determine the new cluster center $C_{merge}$ as $$C_{merge} = \frac{(N_1 C_1 + N_2 C_2)}{(N_1 + N_2)},$$

in which $C_1$ and $C_2$ are respectively the cluster centers of the two neighboring clusters, and $N_1$ and $N_2$ are respectively a number of weight points belonging to the two respective neighboring clusters.

8. A method to reduce weight storage bits for a deep-learning network, the method comprising during a single iteration of the method:
   initializing a predetermined number of clusters $k_l$ for each quantization layer l of the deep-learning network having a plurality of layers;
   for each layer l, repeatedly allocating a centroid for a cluster of weights and quantizing the cluster with respect to the centroid until a lowest average clustering error $\varepsilon_l$ is determined for the layer l;
   determining from the plurality of layers a layer l* having a clustering error $\varepsilon_{l*}$ that is a minimum of the clustering errors $\varepsilon_l$ of the plurality of layers;
   reducing the predetermined number of clusters for the layer l* to be the number of clusters used to quantize the layer l* minus one;
   requantizing the layer l* based on the reduced predetermined number of clusters for the layer l*; and
   continuing to determine from the plurality of layers, another layer l* having a clustering error $\varepsilon_{l*}$ that is a minimum of the clustering errors $\varepsilon_l$ of the plurality of layers, reducing the predetermined number of clusters for the another layer l* to be the number of clusters used to quantize the another layer minus one, and requantizing the another layer l* based on the reduced predetermined number of clusters for the another layer l* until a recognition performance of the deep-learning network has been reduced by a predetermined threshold.

9. The method of claim 8, wherein repeatedly allocating the centroid for the cluster of weights and quantizing the cluster with respect to the centroid until a lowest clustering error is determined for the quantization layer comprises using K-means++ to repeatedly allocate the centroid and quantizing the cluster with respect to the centroid.

10. The method of claim 9, wherein the clustering error $\varepsilon_l$ comprises a square cluster error per non-zero weight.

11. The method of claim 10, wherein the clustering error $\varepsilon_l$ comprises $$\varepsilon_l = \frac{1}{n} \sum_{i=1}^{n} (w_i - C_l)^2, \text{ s.t. } w_i > 0,$$

wherein n is the predetermined number of clusters used to quantize a layer, i is an index variable, $w_i$ is a non-zero weight, and $C_l$ is a centroid for the layer l.

12. The method of claim 10, wherein the predetermined threshold is about 1%.

13. The method of claim 8, wherein initializing the predetermined number of clusters $k_l$ for a quantizing layer comprising merging two neighboring clusters in which a distance between the respective centroids of the two neighboring clusters is less than a predetermined distance to form a new cluster center $C_{merge}$.

14. The method of claim 13, wherein the new cluster center $C_{merge}$ is determined as $$C_{merge} = \frac{(N_1 C_1 + N_2 C_2)}{(N_1 + N_2)},$$

in which $C_1$ and $C_2$ are respectively the cluster centers of the two neighboring clusters, and $N_1$ and $N_2$ are respectively a number of weight points belonging to the two respective neighboring clusters.

15. A system to reduce weight storage bits for a deep-learning network, the system comprising:
   a weight-quantizing module, that during a single iteration of a process to reduce weight storage bits for the deep-learning network, is configured to quantize neural weights of each layer l of a plurality of layers of the deep-learning network based on a predetermined number of clusters $k_l$ that have been initialized for each layer; and
   a cluster-number reduction module that during the single iteration of the process to reduce weight storage bits for the deep-learning network, is configured to reduce the predetermined number of clusters $k_l$ for a layer l*, the layer l* having a clustering error $\varepsilon_{l*}$ that is a minimum of the clustering errors $\varepsilon_l$ of the plurality of layers quantized by the weight-quantizing module, the weight-quantizing module, during the single iteration of the process to reduce weight storage bits for the deep-learning network, being further configured to requantize the layer l* based on the reduced predetermined number of clusters for the layer l* and the cluster-number reduction module, during the single iteration of the process to reduce weight storage bits for the deep-learning network, being further configured to determine from the plurality of layers another layer l* having a clustering error $\varepsilon_{l*}$ that is a minimum of the clustering errors $\varepsilon_l$ of the plurality of layers and to reduce the predetermined number of clusters for the another layer l* until a recognition performance of the deep-learning network has been reduced by a predetermined threshold.

16. The system of claim 15, wherein the cluster-number reduction module comprises a clustering-error determining module that, during the single iteration of the process to reduce weight storage bits for the deep-learning network, is configured to determine from the plurality of quantized layers the layer l* having the clustering error $\varepsilon_l$ that is a minimum of the clustering errors $\varepsilon_l$ of the plurality of quantized layers.

17. The system of claim 16, wherein the weight-quantizing module uses K-means++ to repeatedly allocate a centroid and quantizing a cluster with respect to the centroid of a cluster.

18. The system of claim 17, wherein the clustering error $\varepsilon_l$ comprises a square cluster error per non-zero weight.

19. The system of claim 18, wherein the clustering error $\varepsilon_l$ comprises $$\varepsilon_l = \frac{1}{n} \sum_{i=1}^{n} (w_i - C_l)^2, \text{ s.t. } w_i > 0,$$

wherein n is the predetermined number of clusters used to quantize a layer, i is an index variable, $w_i$ is a non-zero weight, and $C_l$ is a centroid for the layer l.

20. The system of claim 15, further comprising a cluster initializing module that during the single iteration of the process to reduce weight storage bits for the deep-learning network, is configured to initialize the predetermined number of clusters $k_l$ for a quantizing layer by merging two neighboring clusters in which a distance between the respective centroids of the two neighboring clusters is less than a predetermined distance to form a new cluster center $C_{merge}$ as $$C_{merge} = \frac{(N_1 C_1 + N_2 C_2)}{(N_1 + N_2)},$$

in which $C_1$ and $C_2$ are respectively the cluster centers of the two neighboring clusters, and $N_1$ and $N_2$ are respectively a number of weight points belonging to the two respective neighboring clusters.

* * * * *